United States Patent
Ben Gur et al.

(10) Patent No.: US 12,393,718 B2
(45) Date of Patent: Aug. 19, 2025

(54) SYSTEM AND METHOD FOR MANAGING DATA ACCESS REQUESTS

(71) Applicant: Velotix Ltd., Ramat Gan (IL)

(72) Inventors: Adam Ben Gur, Mevaseret-Zion (IL); Adi Hod, Ramat Gan (IL)

(73) Assignee: Velotix Ltd., Ramat Gan (IL)

( * ) Notice: Subject to any disclaimer, the term of this patent is extended or adjusted under 35 U.S.C. 154(b) by 0 days.

(21) Appl. No.: 18/689,112

(22) PCT Filed: Sep. 5, 2022

(86) PCT No.: PCT/IL2022/050963
§ 371 (c)(1),
(2) Date: Mar. 5, 2024

(87) PCT Pub. No.: WO2023/031938
PCT Pub. Date: Mar. 9, 2023

(65) Prior Publication Data
US 2024/0273230 A1    Aug. 15, 2024

(30) Foreign Application Priority Data
Sep. 5, 2021    (IL) .......................... 286186

(51) Int. Cl.
G06F 21/62    (2013.01)
G06N 5/022    (2023.01)

(52) U.S. Cl.
CPC .......... *G06F 21/6218* (2013.01); *G06N 5/022* (2013.01)

(58) Field of Classification Search
CPC .................... G06F 21/6218; G06N 5/022
See application file for complete search history.

(56) References Cited

U.S. PATENT DOCUMENTS 11,445,035 B2 *  9/2022  Duggal ................. H04L 67/34
11,562,009 B2 *  1/2023  Bhattacharya ...... G06F 16/3334
(Continued)

FOREIGN PATENT DOCUMENTS

| WO | WO 2021/028748 | 2/2021 |
| WO | WO 2021/063104 | 4/2021 |
| WO | WO 2023/031938 | 3/2023 |

OTHER PUBLICATIONS

International Preliminary Report on Patentability Dated Mar. 14, 2024 From the International Bureau of WIPO Re. Application No. PCT/IL2022/050963 (6 Pages).
(Continued)

*Primary Examiner* — Harris C Wang

(57) ABSTRACT

In data access management, a data access request builder module is used to receive data characterizing a data access request and generate one or more knowledge graphs therefrom. One or more knowledge graphs of previously approved data access requests having similarities with the one or more knowledge graphs generated for the data access request can be identified by a model trainer module, to thereby generate a global knowledge graph combining the one or more knowledge graphs generated for the data access request with the identified one or more knowledge graphs, and for determining from the global knowledge graph one or more recommendations for improving probability of approval of the data access request. At least one of the one or more knowledge graphs generated for the data access request based on the generated recommendations can be modified and/or augmented by a compliance engine, to thereby generate a modified and/or augmented data access request.

16 Claims, 9 Drawing Sheets

(56) References Cited

U.S. PATENT DOCUMENTS

| | | | |
|---|---|---|---|
| 2011/0093460 A1 | 4/2011 | Lunt | |
| 2015/0095303 A1 | 4/2015 | Sonmcz et al. | |
| 2019/0155940 A1 | 5/2019 | Lecue | |
| 2019/0179878 A1* | 6/2019 | Collins | G06N 5/02 |
| 2019/0236215 A1 | 8/2019 | Agarwal et al. | |
| 2020/0167426 A1 | 5/2020 | Scheideler et al. | |
| 2020/0257730 A1 | 8/2020 | Srinivas et al. | |
| 2020/0389495 A1* | 12/2020 | Crabtree | G06F 16/9024 |
| 2020/0412767 A1* | 12/2020 | Crabtree | H04L 63/1441 |
| 2022/0067204 A1* | 3/2022 | Hadar | G06N 20/00 |
| 2022/0245267 A1* | 8/2022 | Vangala | G06F 16/9024 |
| 2022/0318426 A1* | 10/2022 | Solheim | G06F 21/6245 |
| 2022/0394052 A1* | 12/2022 | Grossman-Avraham | G06F 21/50 |
| 2024/0048592 A1* | 2/2024 | Viswanathan | H04L 63/20 |
| 2024/0195908 A1* | 6/2024 | Bansal | H04M 3/2209 |

OTHER PUBLICATIONS

International Search Report and the Written Opinion Dated Nov. 24, 2022 From the International Searching Authority Re. Application No. PCT/IIL2022/050963. (7 Pages).

Office Action Dated Feb. 20, 2022 From the Israel Patent Office Re. Application No. 286186. 3 Pages).

Search Report Dated Feb. 15, 2022 From the Israel Patent Office Re. Application No. 286186. (4 Pages).

Search Report Dated Feb. 18, 2022 From the Israel Patent Office Re. Application No. 286186. (2 Pages).

Notice of Eligibility of Grant and Examination Report Dated Dec. 4, 2024 From the Intellectual Property Office of Singapore Re. Application No. 11202401501X. (4 Pages).

\* cited by examiner

Request Definition Example

| SETTINGS |
|---|
| REQUEST ID = RID001 |
| REQUEST NAME = Data Access Request |
| REQUEST DESCRIPTION = Request access to data source |

| FIELD 1 |
|---|
| ID = ID001 |
| TYPE = STRING |
| NAME = Request Issuer Name |

| FIELD 2 |
|---|
| ID = ID002 |
| TYPE = STRING |
| NAME = Request Issuer Region |
| PARAMETERS = HIDDEN, FIXED, FILL BY SYSTEM |
| VALUE = [EMEA, LATAM, NA, APAC] |

| FIELD 3 |
|---|
| ID = ID003 |
| TYPE = ENUM |
| NAME = Request Purpose |
| VALUE = [Marketing, Audit, Analytics] |

| FIELD 4 |
|---|
| ID = ID004 |
| TYPE = ENUM |
| NAME = Classification |
| VALUE = [Confidential, Internal, External] |

| FIELD 5 |
|---|
| ID = ID005 |
| TYPE = STRING |
| NAME = Data source name |

SYSTEM AND METHOD FOR MANAGING DATA ACCESS REQUESTS

RELATED APPLICATIONS

This application is a National Phase of PCT Patent Application No. PCT/IL2022/050963 having International filing date of Sep. 5, 2022, which claims the benefit of priority of Israeli Patent Application No. 286186 filed on Sep. 5, 2021. The contents of the above applications are all incorporated by reference as if fully set forth herein in their entirety.

TECHNOLOGICAL FIELD

The present application is generally in the field of data access management particularly as required in data management systems.

BACKGROUND

This section intends to provide background information concerning the present application, which is not necessarily prior art.

Organizations are amassing large amounts of data that they usually cannot access or use due to strict and constantly changing regulations and policies devised to guarantee privacy and compliance with security laws. On the other hand, the regulatory authorities impose harsh penalty fines (e.g., millions of dollars) against entities that violates the privacy and security standards thereby demanded, thereby rendering the data access attempts an intimidating process for small and medium sized enterprises. In addition, the determining of whether individual(s) and/or organization(s) have access rights to certain information is a difficult task in the majority of the cases, because the collected data is usually dull and may often be of low quality. Therefore, the use of symbolic artificial intelligence (AI) and/or machine learning (ML) is usually not possible.

Data access regulations (e.g., the European Union's general data protection regulation—GDPR) used nowadays are generally designed to keep personal/privileged data private and secure, but they often lack guidance about activities that can be carried out in order to comply with the regulation requirements e.g., data anonymization and/or masking to be performed to prevent direct or indirect identification of data subjects (the entity whose data is processed). Therefore, many data access requests are frequently refused by approvers/officers due to lack of proper data handling actions, that, if were suggested by the requester in the first place, would have rendered the request permissible.

Some access right managements solutions known from the patent literature are briefly described hereinbelow:

US Patent Publication No. 2019/179878 describes a method for expanding a knowledge graph covering organization-specific content provided by a content management platform includes identifying a knowledge graph comprising a plurality of nodes representing a plurality of defined terms, scanning a plurality of communications from a plurality of sources of an organization to identify a plurality of frequently appearing terms, determining which of the plurality of frequently appearing terms are not included in the plurality of defined terms of the knowledge graph to produce a set of undefined frequently appearing terms, prompting one or more members of the organization to provide a definition for each undefined frequently appearing term from the set of undefined frequently appearing terms, wherein the prompting occurs without a user input, and expanding the knowledge graph by adding one or more undefined frequently appearing terms, each having a provided definition, to the knowledge graph.

US Patent Publication No. 2020/257730 describes techniques for generating a unified knowledge graph. In one example, a method includes receiving entity data from a data source comprising a plurality of entities; forming a plurality of type-specific groups of entity data based on the received entity data; for each respective type-specific group of entity data of the plurality of type-specific groups of entity data; disambiguating the entity data within the respective type-specific group of entity data; creating a plurality of entity relationships based on the disambiguated entity data; and exporting the plurality of entity relationships to a type-specific subgraph; and forming a unified knowledge graph based on a plurality of type-specific subgraphs, wherein each type-specific subgraph of the plurality of type-specific subgraphs is associated with a single type-specific group of entity data of the plurality of type-specific groups of entity data.

International Patent Publication No. WO 2021/028748 describes a computer-implemented method for managing access rights to a knowledge graph. The method comprises splitting, for each user system, its respective portion of the knowledge graph into a plurality of knowledge subgraphs, encrypting each of the knowledge subgraphs, and generating a plurality of private summary graphs. The method also comprises maintaining a collaboration graph comprising one vertex per user system and edges representing collaborations between the users, mapping all private subgraphs of all user systems to one public summary graph, each vertex of the public summary graph comprises less data than the related vertex of the related private summary graphs and wherein none of the vertices of the summary graph comprises any encryption or decryption key, and granting access to a selected knowledge subgraph from a first user system to a second user system.

The references cited above teach background information that may be applicable to the presently disclosed subject matter. Therefore, the full contents of these publications are incorporated by reference herein where appropriate for appropriate teachings of additional or alternative details, features and/or technical background.

GENERAL DESCRIPTION

There is thus a need for data access tools for effectively requesting access rights, mitigating risks, and that can be used to enrich the collected data to provide high quality data for efficient processing of the data access requests e.g., using symbolic AI and/or ML with the enriched data to determine access rights thereof. The present application provides techniques for simplifying data access requests, and/or integrating into the data access request process tools for enhancing compliance of the request with data privacy/security requirements, and/or defining policies based on accumulated history of approved data access requests to promote reusability and restoration of data access approvals. System and method are accordingly disclosed for facilitating data request access processes, improving approval rates of such requests, and mitigating the risks of penalties due to inappropriate handling/processing of the accessed data.

In order to provide a level of abstraction, for each data access request one or more knowledge graphs are initially defined to provide an integration framework for such data access requests. Use of such knowledge graphs permits efficient processing of the requests and use of cybernetic modeling tools to identify in accumulated history of such past requests (e.g., by AI and/or ML) actions and/or conditions that can be incorporated in the data access request to improve its approval probability. In some embodiments a specially designed domain specific language (DSL) is used to represent each data access request by one or more complying knowledge graphs. The DSL can be configured to define organization (e.g., financial) specific meta graphs for standardizing internal/external data access process.

The data access requests management solutions disclosed herein are designed to automate and streamline the data access request and authorization process, accelerate real-time data-to-insights processes, and enable enterprises to adhere to regulations and policies, and/or ensure that sensitive digital assets are safeguarded against misuse. An enterprise compliance portal can be used for automating the data access process. The compliance portal can be configured to examine users' authorizations, create a high-quality policy repository based on accumulated past data access requests, consider existing data catalogs (e.g., integration with Google cloud platform—GCP), apply symbolic AI/ML in a cybernetic user dependent approach (i.e., the 'human is in the loop') to provide self-learning abilities, and operation via a rule based engine utilizing machine learning to identify compliance functions, and/or providing reporting and analysis tools.

The present application utilizes in some embodiments symbolic AI modeling based on a cybernetic approach for devising models representing the compliance process, and as part of the cybernetic process with the user, captures explicit data access rules. This way, data access policies can be realized by the system, and policy components, which are the interpretation obtained from the explicit rules via the modeling process, can be efficiently defined. This approach is based on 'action-oriented' models, and differentiating between static rules (e.g., strictly defined if-then action rules that can be manually defined by the user/approver) and dynamic rules (generated dynamically/automatically by the system). For example, but without being limiting, in processing access to financial data ML methods can be applied on compliance processes, using the policy catalogue of accumulated past history data access requests. The system can be adapted to enable addition/update financial use cases in a configuration mode by the enterprise architect.

One aspect of the subject matter disclosed herein relates to a data access management system comprising: a data access request builder module configured and operable to receive data characterizing a data access request and generate one or more knowledge graphs therefrom; a model trainer module configured and operable to identify one or more knowledge graphs of previously approved data access requests having similarities with the one or more knowledge graphs generated for the data access request, generate a global knowledge graph comprising the identified one or more knowledge graphs, and determine from the global knowledge graph one or more recommendations for improving probability of approval of the data access request; and a compliance engine configured and operable to modify and/or augment at least one of the one or more knowledge graphs generated for the data access request based on the generated recommendations, to thereby issue a modified and/or augmented data access request. Optionally, but in some embodiments preferably, the global knowledge graph is generated to combine the one or more knowledge graphs generated for the data access request with the identified one or more knowledge graphs.

The system comprises in some embodiments one or more data processors configured to examine actions and/or conditions defined in the identified one or more knowledge graphs and determine based thereon the one or more recommendations. The system can be configured to use a machine learning engine e.g., by the data processor, for examining the identified one or more knowledge graphs and/or determining the one or more recommendations. The data processor can be configured to construct a stack of the identified one or more knowledge graphs for simplifying detection of repetitive and/or duplications of concepts, entities, literals and/or relations between the identified one or more knowledge graphs.

The data processor is configured in some embodiments to determine weights for routes and/or entities detected in the identified one or more knowledge graphs. In some embodiments the data processor is configured to determine a measure of approval probability of the data access request based at least in part on a measure of similarity thereof to data access request of the identified one or more knowledge graphs. Optionally, the data processor is configured to determine the one or more recommendations at least partially based on the determined measure of approval probability.

The system comprises in some embodiments a modeler module configured and operable to receive and process resolution data indicative of approval or denial of the modified and/or augmented data access request, and generate based thereon recommendation data for further processing of the modified and/or augmented data access request by the compliance engine.

Optionally, but in some embodiments preferably, the recommendation data is configured to cause the compliance engine to generate a policy from the one or more knowledge graphs of the modified and/or augmented data access request whenever the resolution data is indicative of approval of said modified and/or augmented data access request. Alternatively or additionally, the recommendation data can be configured to cause the compliance engine to further augment and/or modify the knowledge graphs of the modified and/or augmented data access request according to weights and/or priorities of elements of knowledge graphs included in the global knowledge graph. Optionally, the recommendation data is configured to further cause the compliance engine to generate a policy from the one or more knowledge graphs of the further modified and/or augmented data access request.

The compliance engine is configured in some embodiment to manage and monitor authorization of the data access request. Optionally, but in some embodiments preferably, the compliance engine is configured to monitor and manage data access of the authorized data access requests.

The system comprising in possible embodiments a data access module configured to extract and/or transform data from one or more data sources and represent the same within limitations defined by the authorized data access request. A policy repository can be used for storing knowledge graphs of the modified and/or augmented data access request data access requests that been authorized, and their generated recommendations.

Another inventive aspect of the subject matter disclosed herein relates to a data access management method according to any of the data access management techniques disclosed hereinabove or hereinbelow, or as illustrated in any of the accompanying drawings.

A computer-implemented data access management method comprises in some embodiments receiving data characterizing a data access request, using processors' of the system for processing the received characterizing data and generating one or more knowledge graphs therefrom, identifying one or more knowledge graphs of previously approved data access requests having similarities with the one or more knowledge graphs generated for the data access request, generating a global knowledge graph comprising the identified one or more knowledge graphs and optionally also the one or more knowledge graphs generated for the characterizing data, determining from said global knowledge graph one or more recommendations for improving probability of approval of the data access request, and modifying and/or augmenting at least one of the one or more knowledge graphs of the data access request based on the generated recommendations, to thereby issue a modified and/or augmented data access request.

The method comprises in some embodiments examining actions and/or conditions defined in the identified one or more knowledge graphs and determining based thereon the one or more recommendations. Machine learning tools can be used for the examining of the identified one or more knowledge graphs and/or for the determining of the one or more recommendations. The method can comprise constructing a stack of the identified one or more knowledge graphs for simplifying detection of repetitive and/or duplications of concepts, entities, literals and/or relations between said identified one or more knowledge graphs.

In possible embodiments the method comprises determining weights for routes and/or entities detected in the identified one or more knowledge graphs. The method can comprise determining a measure of approval probability of the data access request based at least in part on a measure of similarity thereof to data access request of the identified one or more knowledge graphs. Optionally, the method comprising determining the one or more recommendations at least partially based on the determined measure of approval probability.

The method can comprise receiving and processing resolution data indicative of approval or denial of the modified and/or augmented data access request, and generating based thereon recommendation data for further processing of the modified and/or augmented data access request. The method optionally comprising generating a policy from the one or more knowledge graphs of the modified and/or augmented data access request whenever the resolution data is indicative of approval of the modified and/or augmented data access request.

In some embodiments the method comprises further augmenting and/or modifying the knowledge graphs of the modified and/or augmented data access request according to weights and/or priorities of elements of knowledge graphs included in the global knowledge graph. Optionally, the method comprises generating a policy from the one or more knowledge graphs of the further modified and/or augmented data access request.

The method may further comprise storing metadata and/or tagging data items incorporated in the data access requests in a dedicated repository. Optionally, but in some embodiments preferably, the method comprises managing and/or monitoring authorization of the data access request. The method can comprise managing data access of the authorized data access requests. The data access may comprise extracting and/or transforming data from one or more data sources and representing the same within limitations define by the authorized data access request. Optionally, the method comprises storing in a repository knowledge graphs of the modified and/or augmented data access request data access requests that been authorized, and their generated recommendations.

Yet another aspect of the subject matter disclosed herein relates to an access management software executable by one or more processors and memories and configured to process one or more knowledge graphs associated with an issued data access request in relation to one or more knowledge graphs associated with previously approved data access requests, construct a global knowledge graph from the processed knowledge graphs, identify in the global knowledge graph routes and/or entities and/or actions and/or conditions that are common to the processed knowledge graphs and determine based thereon recommendation for improving approval probability of the issued data access request.

The access management software according can be configured to modify and/or augment the issued data access request based on the determined recommendations. In possible embodiments the access management software comprises in some embodiments machine learning tools configured to examine the knowledge graphs and/or determine the one or more recommendations. The access management software can be configured to determine weights for routes and/or entities detected in the processed knowledge graphs, and use the determined weights to determine the one or more recommendations and/or modify and/or augment the issued data access request.

In possible embodiments the access management software is configured to determiner a measure of approval probability of the issued data access request based at least in part on a measure of similarity of the one or more knowledge graphs associated therewith to the one or more knowledge graphs associated with the previously approved data access requests. Optionally, the access management software is configured to determine the one or more recommendations at least partially based on the determined measure of approval probability.

The access management software is configured in some embodiments to process resolution data indicative of approval or denial of the modified and/or augmented data access request, and generate based thereon recommendation data for further processing of the modified and/or augmented data access request. Optionally, but in some embodiments preferably, the access management software is configured to generate a policy from the one or more knowledge graphs of the modified and/or augmented data access request whenever the resolution data is indicative of approval of the modified and/or augmented data access request.

The access management software is configured in some embodiments to manage and/or monitor authorization of the issued data access request. Optionally, the access management software is configured to manage data access of the authorized data access requests. The access management software can be configured to extract and/or transform data from one or more data sources and represent the same within limitations defined by the authorized data access request.

In possible embodiments the access management software is configured to store in a repository knowledge graphs of the modified and/or augmented data access requests that been authorized, and their generated recommendations.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 4A and 4B exemplify data request construction forms usable according to some possible embodiments;

DETAILED DESCRIPTION OF EMBODIMENTS

Figure 1:
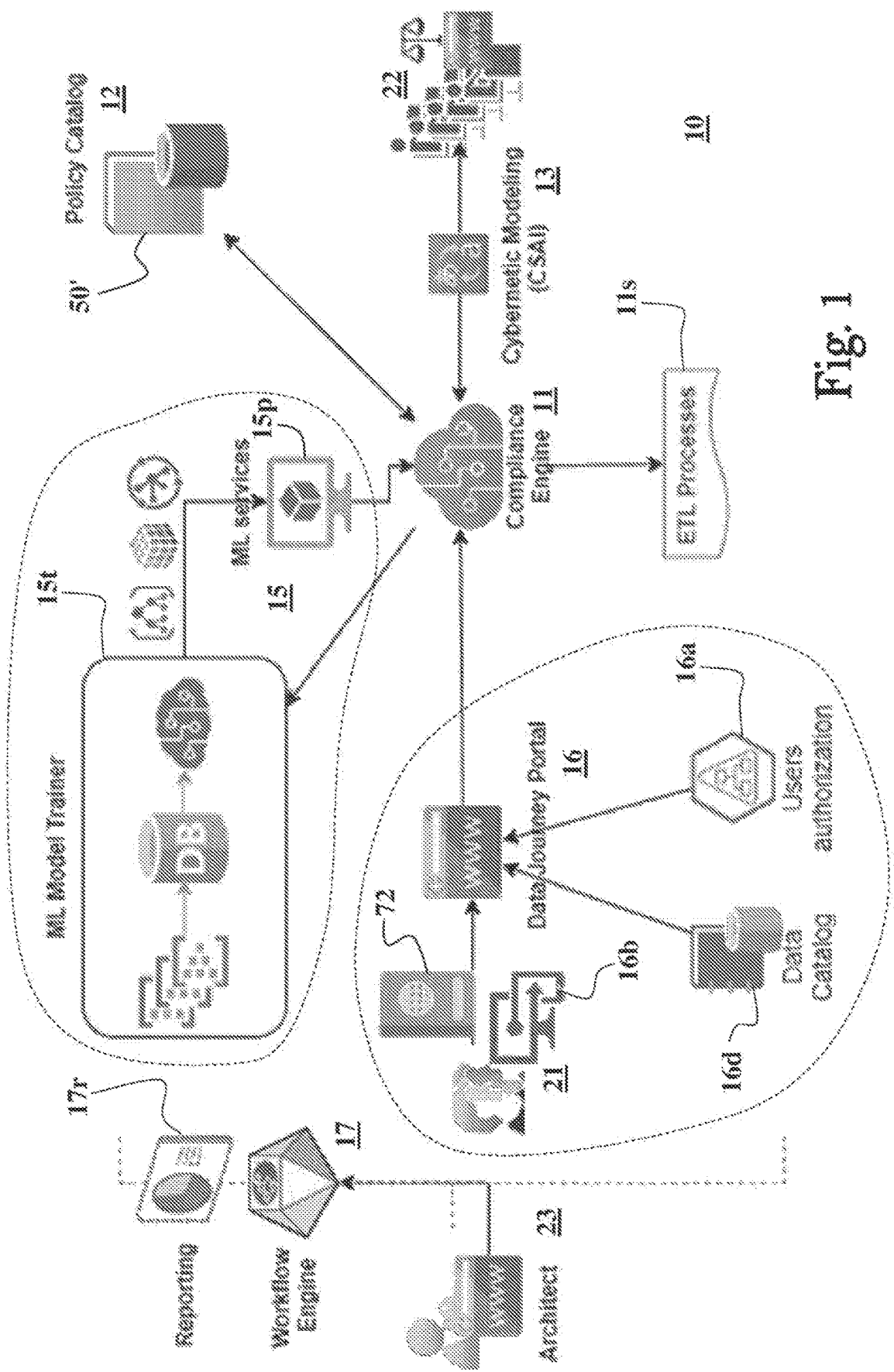
FIG. 1 schematically illustrates components of a data access management system, and their interactions, according to some possible embodiments.

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Emphasis instead being placed upon clearly illustrating the principles of the invention such that persons skilled in the art will be able to make and use the data access management techniques of the present disclosure, once they understand the principles of the subject matter disclosed herein. This invention may be provided in other specific forms and embodiments without departing from the essential characteristics described herein.

The data access management system/method disclosed herein is configured to substantially alleviate the data access authorization process by providing software (e.g., graphical) tools for efficient construction of data access requests, generation of one or more corresponding knowledge graphs configured to enable cybernetic modeling of the access requests, detection of actions/conditions (e.g., by AI and/or ML) in history of knowledge graphs of similar past data access requests for incorporation in the current, and future such, data access requests, for improving its/their approval probability. The system/method is thus configured in some embodiments to produce for each data access request a stack of knowledge graphs of corresponding/similar past data access requests, which are used to define a global knowledge graph for the data access request being processed.

The knowledge graphs of the stack/global knowledge graph of similar past approved data access requests are examined to identify routes, actions and/or conditions, therein that if followed increase the probability of getting the data access request approved. The knowledge graphs processing steps can be further used to augment one or more of the knowledge graphs of the current data access request by identifying complementary data in the global knowledge graphs of past similar access requests that is absent in the knowledge graph(s) of the current data access request, but comply with entities that participate in the knowledge graphs of the current and past similar data access requests.

After performing the analysis, and/or augmenting, and/or identification and selection of high probability routes/actions/conditions, and/or incorporation of conditions/actions for improving approval probabilities, of the current data access request, the modified/augmented knowledge graphs of the current data access request is passed to the approvers/officers' of the organization for examination and authorization. If the data access request is approved, it is recorded in a policy catalog database for reference and modeling for future data access requests, and the access to the requested data is enabled after carrying out any access conditioning and/or actions (e.g., anonymization) the modified data access request necessitates.

If the data access request is rejected, steps for determining the reasons for the rejection are performed to determine any conditions and/or actions required to render the request permissible. A re-processing stage is then performed to modify the knowledge graph(s) of the data access request with reference to the accumulated knowledge graphs of the similar past requests in order for it to comply with and fulfil the determined conditions and/or activities required for its approval. The re-processed/modified data access request is then passed again for authorization by the approver/office. This process of re-processing and modifying the data access request for further examination by the approvers can be repeated any number of times until the data access request is approved.

For an overview of several example features, process stages, and principles of the invention, the examples of financial data access illustrated schematically and diagrammatically in the figures are intended for data access management. These data access management systems/methods are shown as one example implementation that demonstrates a number of features, processes, and principles used to provide data access authorization tools, but they are also useful for other applications and can be made in different variations. Therefore, this description will proceed with reference to the shown examples, but with the understanding that the embodiments disclosed herein can also be implemented in myriad other ways, once the principles are understood from the descriptions, explanations, and drawings herein. All such variations, as well as any other modification apparent to one of ordinary skill in the art and useful in data access management applications may be suitably employed, and are intended to fall within the scope of this disclosure.

FIG. 1 schematically illustrates a data access management system 10, according to some possible embodiments. The data access management system 10 comprises a workflow engine 17, a data access portal 16, a machine learning system 15, a policy catalogue database 12, a cybernetic modelling system 13, and a compliance engine 11.

Figure 2:
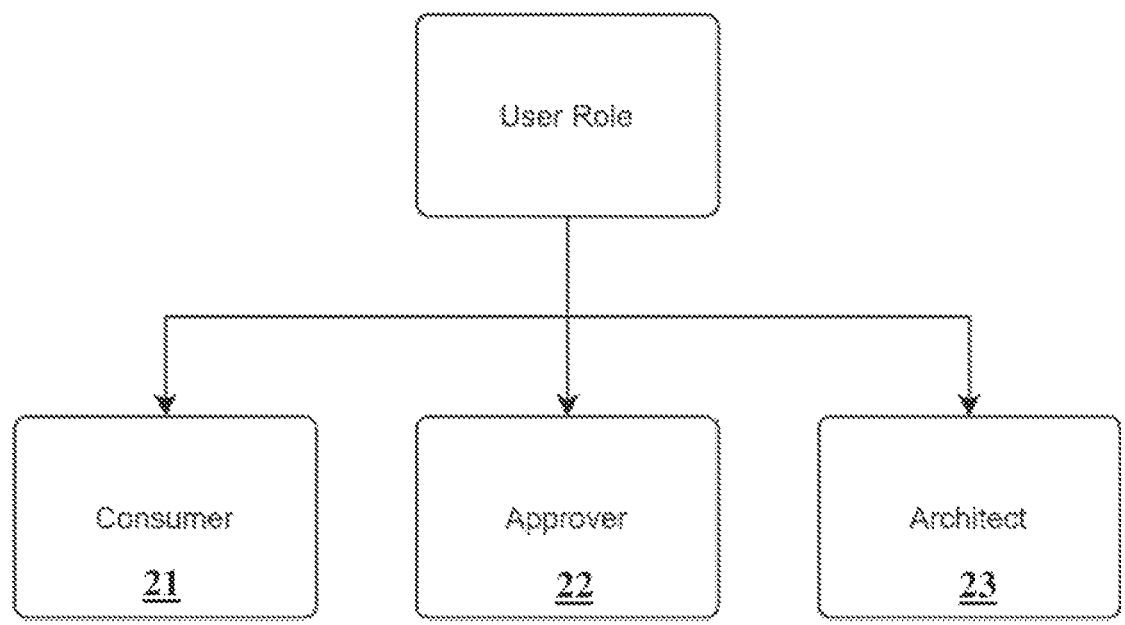
FIG. 2 is a block diagram schematically illustrating types of users that participate in the data access management system/method according to some possible embodiments.

FIG. 2 is a block diagram illustrating roles of different users of the system 10, which includes in some embodiments one or more consumers 21, one or more approvers 22, and one or more architects 23. The consumers 21 are the users (e.g., data analysts, data owners) that issue data access requests 72 and wait for their approval. The approvers 22 are officers (e.g., compliance officers, policy administrators) of the organization that maintains the policies of the organization, examine the data access requests 72 issued by the consumers and authorize or reject these data access requests 72 based on predefined policies. The architects (e.g., CTO, IT Engineer) 23 are professional personals that configure and design the business flows, define request elements and policies for the data access requests procedures executed by the system 10. In general, a user cannot have more than one role in the same system 10 i.e., the approver 22 cannot approve an access request for himself.

Figure 5A:
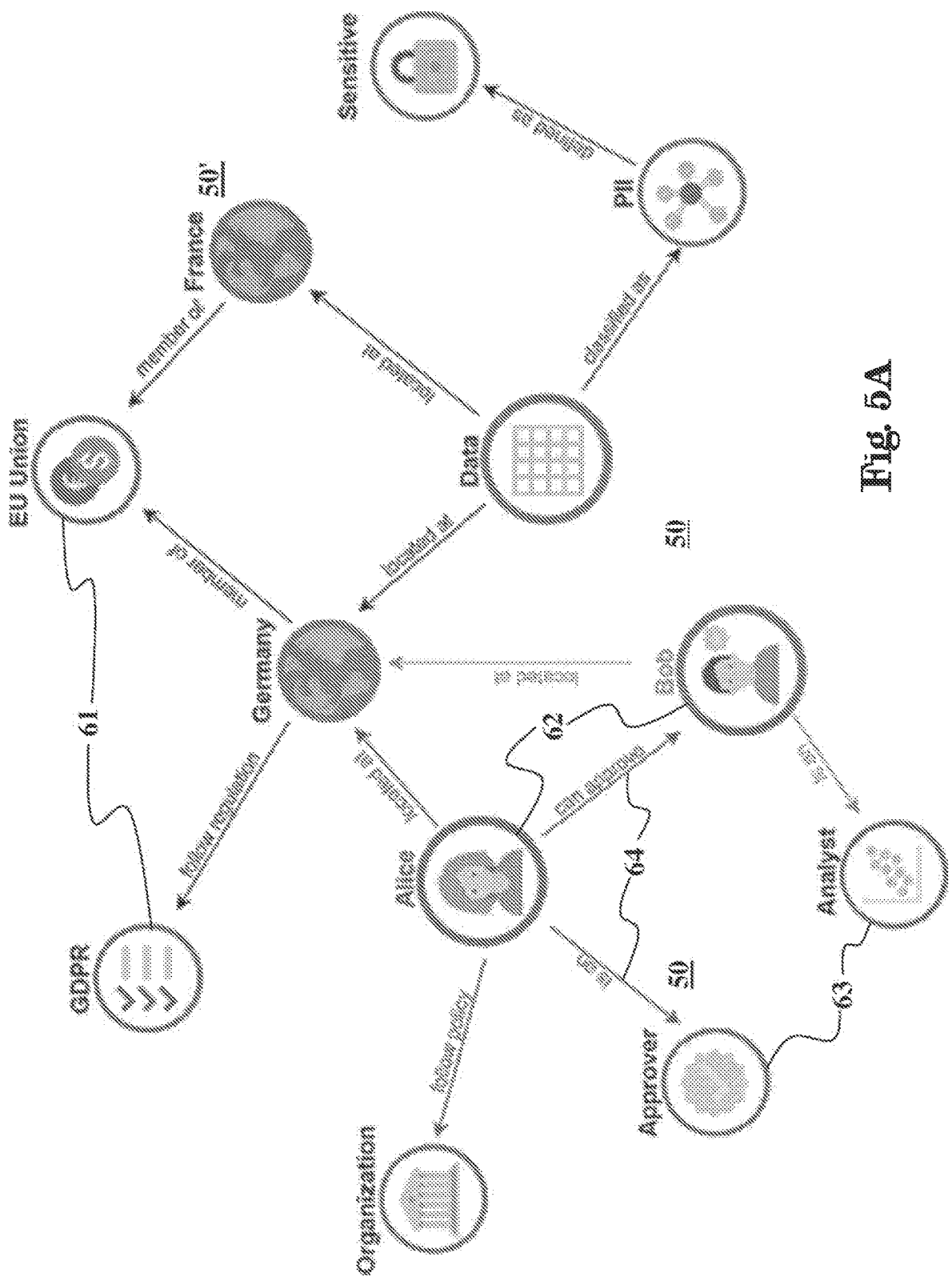
FIGS. 5A and 5B schematically illustrate construction of knowledge graphs for data access requests, and augmentation of such knowledge graphs based on accumulated history of similar knowledge graphs, according to some possible embodiments.

The workflow engine 17 is configured to orchestrate the data access request examination processes and workflows of such requests and generate reports 17r summarising the data access operations carried out by the system 10. In some embodiments the architects 23 are responsible of constructing e.g., using DSL, user interfaces configured to receive and properly organize the data access requests 72 from the consumers 21 to construct one or more knowledge graphs (e.g., 50 in FIGS. 5A and 5B) therefrom. The workflow engine 17 can be configured to manage automation of data access request examination processes, and of tasks performed by different components/parties of the system 10.

The system architects 23 can use the workflow engine 17 to define business workflows, and/or control and coordinate their execution. In some embodiments the workflow engine 17 is configured to provide flexibility to support multiple business use case and scenarios. Since each organization has different flow for its own business processes, and usually also its own user interface (UI), the engine 17 that executes the flow should be flexible and easy to setup, configure and adapt, per organization's requirements.

The data access portal 16 is configured to provide the consumer/users 21 of the organization user-interfaces (UIs) for constructing data access requests 72 and/or policies (e.g., over data/computer networks, such as the Internet). The UIs of the system 10 utilize in some embodiments a request/policy builder module 16b cable of building and validating data access requests 72 and/or policies issued in a specific organization. The data access portal 16 can be configured to utilize a users' authorization module 16a for authenticating the consumer/users 21 requesting to use the request/policy builder module 16b, and a data catalog 16d used for storing metadata and tags of data items incorporated in the data access requests 72 (and/or policies) e.g., descriptive to the data itself. For example, tags can be used on a database level, table level, and/or column level, to provide annotations such as "PII" (personal identifiable information), or more granular description such as "first name", "SSN" (social security number), or suchlike. This part of the system 10 can be embedded and maintained by the architects 23 of the organization.

A specially designed DSL is used in some embodiments to enable flexibility by abstraction of the construction of the data access requests 72 by the request/policy builder module 16b e.g., utilizing a graphical user interface configured to simplify the request/policy construction process. The request/policy builder module 16b is configured in some embodiments to convert each data access request 72 thereby constructed into respective one or more knowledge graphs (50). The knowledge graphs (50) generated by the request/policy builder module 16b are configured to represent the entities (62 in FIG. 6A) and/or data items of the constructed data access request 72 and/or policy by graph nodes, and attributes and/or actions/functions related to the entities and/or data items of the request and/or policy by edges/relations connecting between the respective nodes (sec e.g., 50 in FIGS. 5A and 5B).

Figure 4A:
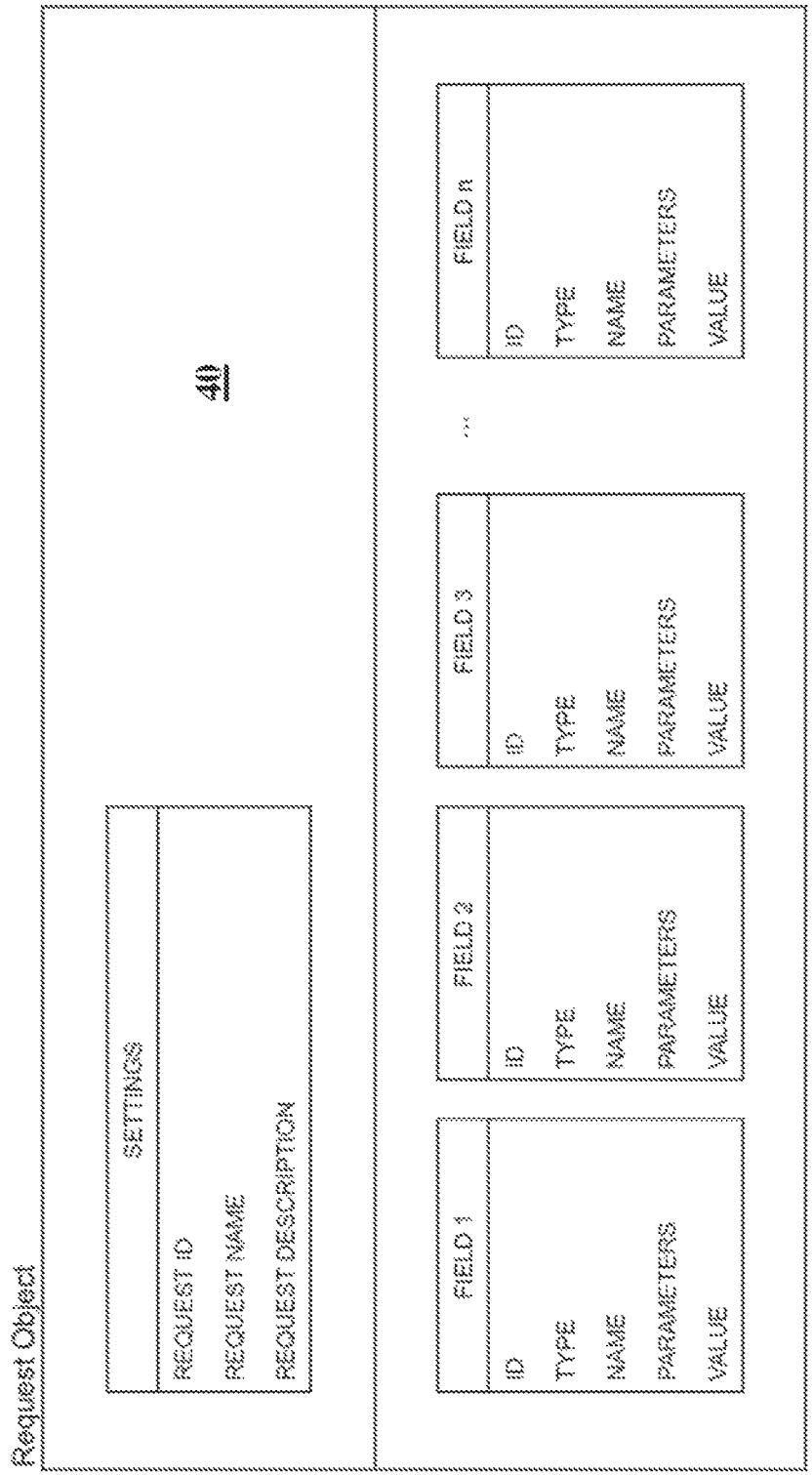

FIGS. 4A and 4B exemplify a user interface usable for definition of elements of data access requests (72) according to some possible embodiments. FIG. 4A exemplifies a user interface 40 usable for defining by the consumer (21) an object/entity of a data access request (72) (and/or policy). The data access request (72) and/or policy builder module 16b can be configured to present to the consumer (21) the user interface 40 for inputting the settings data of the object and its respective data fields, as required for defining the object in a respective knowledge graph. FIG. 4B exemplifies a UI 41 of the data access request/policy builder module 16b with the information entered by the consumer (21) for definition of a certain knowledge graph object.

The data access request/policy builder module 16b can be used to define new policies e.g., using a manual policy editor (not shown). The request/policy builder module 16b can be configured for semi-automatic policy creation e.g., by receiving and compiling data associated with a certain type of data access request and applying the same to set of rules/actions of previously defined policies. However, the request/policy builder module 16b can be similarly configured to automatically generate the policies after the accumulation of past (history of) data access requests (72) in the system (10). Knowledge graph(s) of a data access request/policy may generally comprise attributes, entities (62), collections, conditions (defining rules applied by the policy), and/or actions (a set of procedures that should be carried out if a data access request/policy is approved and to be applied e.g., by executing extract-transform-load (ETL module 11s), that apply masking/anonymization and/or redaction, move data to a data lake or cloud, and/or granting access, etc.), wherein the conditions and actions of the data access request (72) and/or policy can be derived from the attributes of each entity (62) in the request (72) and/or policy that is being constructed by the request/policy builder module 16b.

The collections are groups of attributes of entities (62) that define relations (64) between multiple attributes of the entities involved in the data access request (72), and that might expose knowledge of each other. Collections are defined in some embodiments by the user per data access request (e.g., PII), that can be used to define conditions/relations from the attributes of the entities that the data access request is associated with. The collections may require special reference while defining a condition (or a policy, as can be carried out later on in data access request process).

Additionally, or alternatively, the request/policy builder module 16b can be configured to require users' (consumer 21 and/or architect 23) intervention in the policy rules definition process, to build symbolic reasoning for facilitating use of symbolic reasoning AI by the system 10. The use of the user defined symbolic reasoning rules and conversion of each request into a plurality of corresponding knowledge graphs is exploited in embodiments disclosed herein for cybernetic modeling of the data access request/policies accumulated over time by ML and AI tools, used to enhance and improve approval probabilities of future data access requests/policies constructed by the system 10.

For example, the access request/policy builder module 16b can be configured to facilitate manual construction of users' defined static rules (e.g., if-then rules for executing actions whenever certain conditions are fulfilled. In possible embodiments the data access request/policy builder module 16b is configured to suggest to the user/approver to incorporate in the data access request 72 dynamic rule(s) automatically defined by the system 10 based on the policy catalogue 12 of accumulated approved past/history data access requests. Such automatically defined dynamic rules may become over time static/obligatory rules. It is noted that the static rules generally have greater weight in the examination process of the data access requests, as they are strictly defined.

Figure 6A:
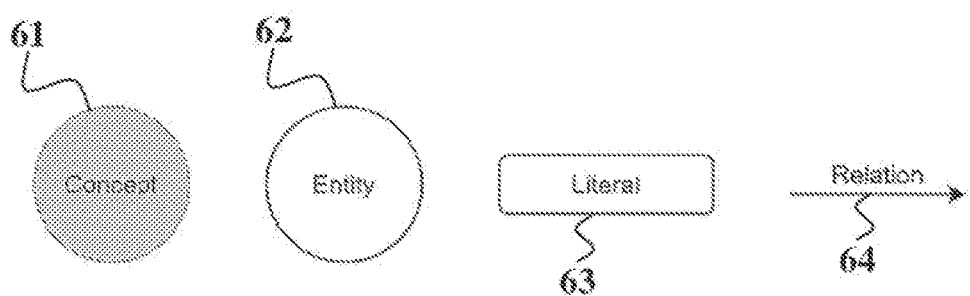
FIGS. 6A to 6C exemplify knowledge graphs of data access requests, and their components, according to some possible embodiments.
Figure 6B:
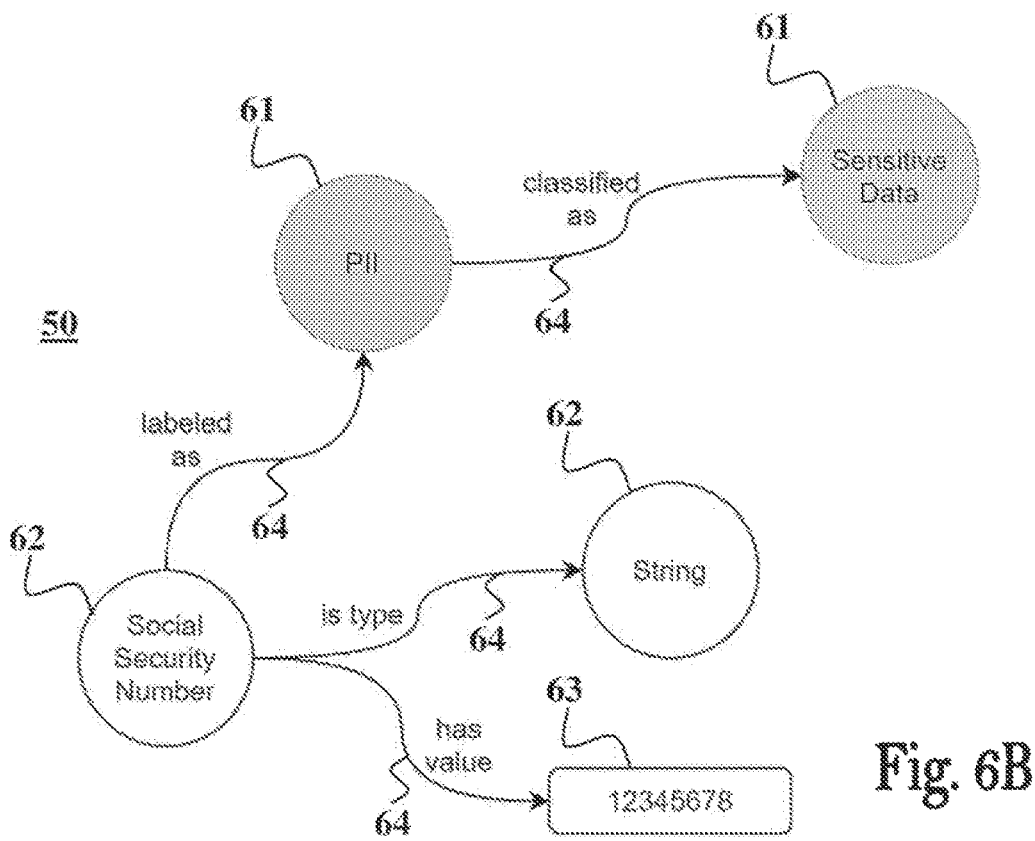

FIGS. 6A and 6B exemplify knowledge graphs 50 of data access requests (72), and their components, according to some possible embodiments. With reference to FIG. 6A, a knowledge graph (50) of a data access request (72) according to the present disclosure can be constructed from concepts 61, entities 62 and literals 63, that are connected by edges 64 defining relations therebetween. The concept 61 is an entity that has meaningful knowledge and/or known to the system 10 e.g., a USER is a Concept, that has connections to roles, department, geolocation, and additional attributes etc., that the user (consumer 21 or architect 23) has defined as meaningful. The concept 61 may have priority, possibly defined by the architect user 23 e.g., process flow priorities can be assigned to some vertices of routes in the knowledge graph constructed for the data access request (i.e., the route must pass through the vertex of greater priority), or when constructing the knowledge graph such priorities can be assigned to certain vertices to indicate that those vertices must exist/remain in the stack/global knowledge graph for completeness.

The entity 62 is an object that the system has no knowledge about i.e., a characterizable type whose instances can be interrelated by relations (e.g., that have the entity as their domain). The literal 63 is an element that represents a specific value (e.g., it may be classified with its type). The edge/relation 64 defines a directional relation between its domain entity (at its start point) and its range entity (at its arrowed end point). While some edges/relations 64 may be defined by the architect user (23), generally the relations' labels are unknown initially. Such unknown edges/relations 64 may be labeled by a user (consumer 21 or architect 23) in a way that the system (10) can get knowledge/information about the actual relation to be defined in the knowledge graph e.g., from the accumulated approved past history data access requests recorded in the policy catalogue 12. Optionally, but in some embodiments preferably, if a relation/edge 64 has a high weight (e.g., it is used in many knowledge graphs) the system (10) may ask for definition of this relation from the user (consumer 21 or architect 23).

FIG. 6B exemplifies a knowledge graph 50 having a concept 61 defining a PII (personal identifiable information) connected by a relation 64 labeled "classified by" to another concept 61 defining a sensitive data object, an entity 62 defining a social security number (SSN) connected by a relation 64 labeled "is type" to another entity 62 defining a string type, where the entity 62 defining the social security number is also connected by a relation 64 labeled "has value" to the literal 63 "12345678".

After a data access request/policy is constructed by the request/policy builder module 16b, it is examined by the compliance engine 11, which is configured and operable to manage and monitor the data access request authorization process, and also the actual data access process by the consumer(s) 21, after the data access request is approved e.g., utilizing data access services 11s, such as executing extract-transform-load—ETL processes/module 11s configured for copying data from one or more sources and representing the same in a different context.

The compliance engine 11 can be further configured to record the approved data access requests in the policy catalogue 12. The policy catalogue 12 is a repository of approved data access requests of the organization, and the approved data access requests are recorded and maintained therein as organization's policies for compilation, modeling, and reference for processing of future data access requests by the compliance engine 11.

The cybernetic modelling system 13 can be a CSAI (computer science artificial intelligence) based modeler designed to identify in the knowledge graph(s) 50 of the data access request (72) patterns that are common to previously approved data access requests 50', and provide to the compliance engine 11 corresponding recommendations to modify the data access requests that are being thereby examined by incorporating in them conditions and/or actions that can increase their probability of being approved. The cybernetic modelling system 13 is configured to support the compliance engine 11 in acting and interacting with data access procedures in evolving work environment, and in building the policy catalogue 12.

Figure 6C:
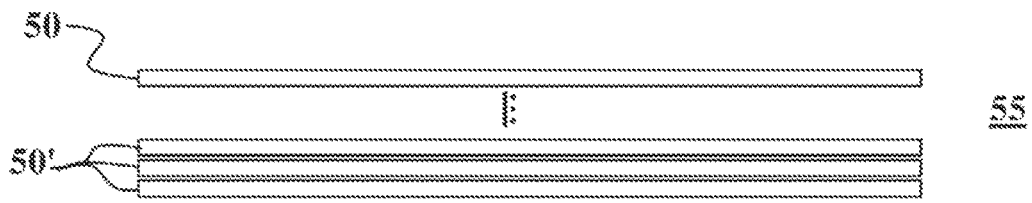

Before transferring the data access request to the approver(s) 22, it is inspected by the ML model trainer 15t, which is configured and operable to identify similarities between the knowledge graph(s) 50 of a data access request (72) newly received from the request/policy builder module 16b and the knowledge graphs of the previously approved data access requests recorded in the policy catalogue 12, and accordingly associate the knowledge graph(s) 50 of the newly received data access request with the knowledge graphs 50' of the similar previously approved data access requests thereby identified in the policy catalogue 12, thereby defining a global knowledge graph 55 comprising all similar data access requests recorded in the system, as exemplified in FIG. 6C.

The ML services module 15, and/or other data processing means/computer 15p thereof, can then examine actions and/or conditions defined in the knowledge graphs 50' of the identified similar previously approved data access requests i.e., the global knowledge graph 55, and determine one or more recommendations for use by the compliance engine 11 in augmenting/modifying the knowledge graph(s) 50 of the newly received data access request (72). In some embodiments the ML services module 15 (or other processing means) determines the one or more recommendations based on weights assigned by the ML model trainer system 15t and/or the cybernetic modeling system 13 to the actions/conditions defined in the knowledge graphs 50' of the previously approved data access requests recorded in the policy catalogue 12.

For example, but without being limiting, the plurality of knowledge graphs 50' of multiple associated data access requests in a global knowledge graph 55 can be stacked "one on top of the other" to find repetitive and/or duplications of concepts, entities, literals and/or relations between their data access requests, and to identify "weight" of routes and "weight" of entities according to their number of instances, to thereby provide a measure of approval probability thereof. In possible embodiments the system 10 is configured to encode all knowledge graphs 50/50' in every data access request to construct continuous vector(s) using all of the knowledge graphs nodes that are related to a certain request, for gaining the "weight" and "priority" of entities that may need user's attention during the request fulfilment. Elements with high weight may be identified by a user in a way that the system can get knowledge of that element. Elements and relations on the vector may be highlighted and prioritized for additional human attention.

Figure 5B:
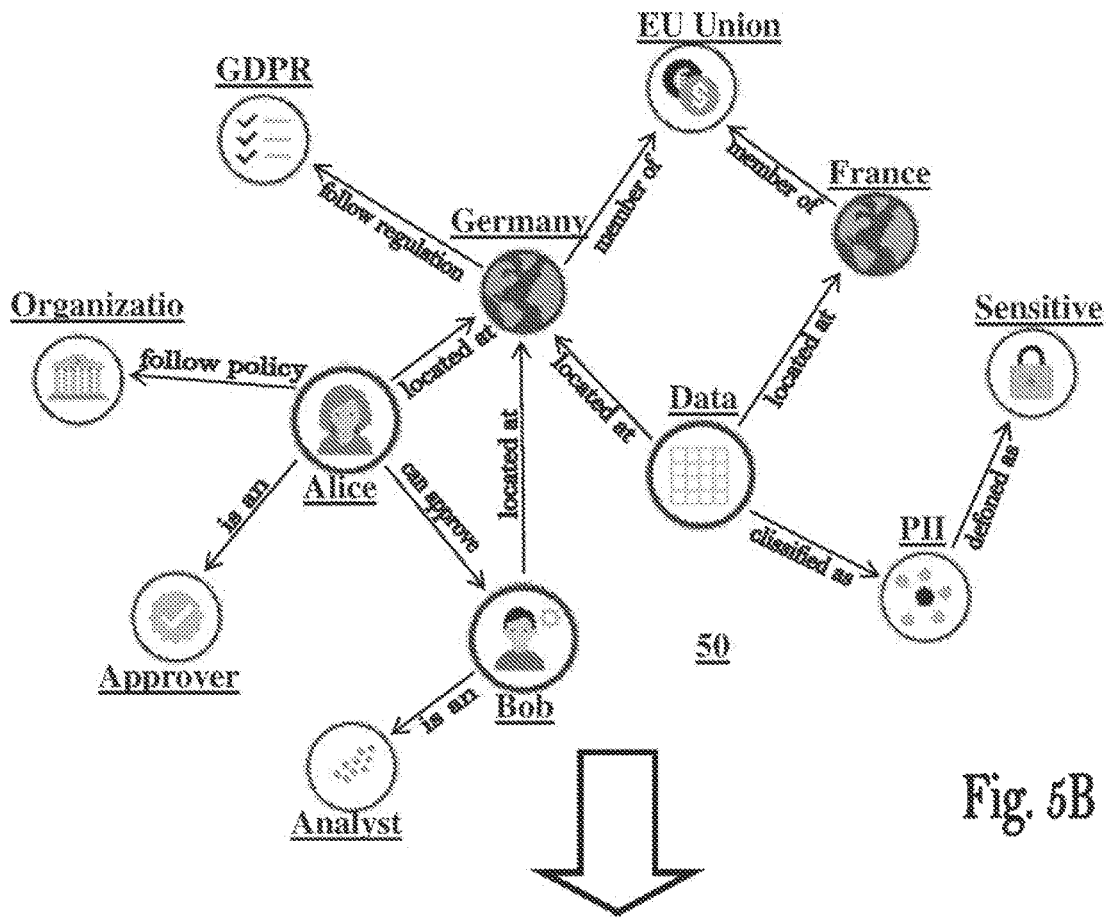
Figure 5B:
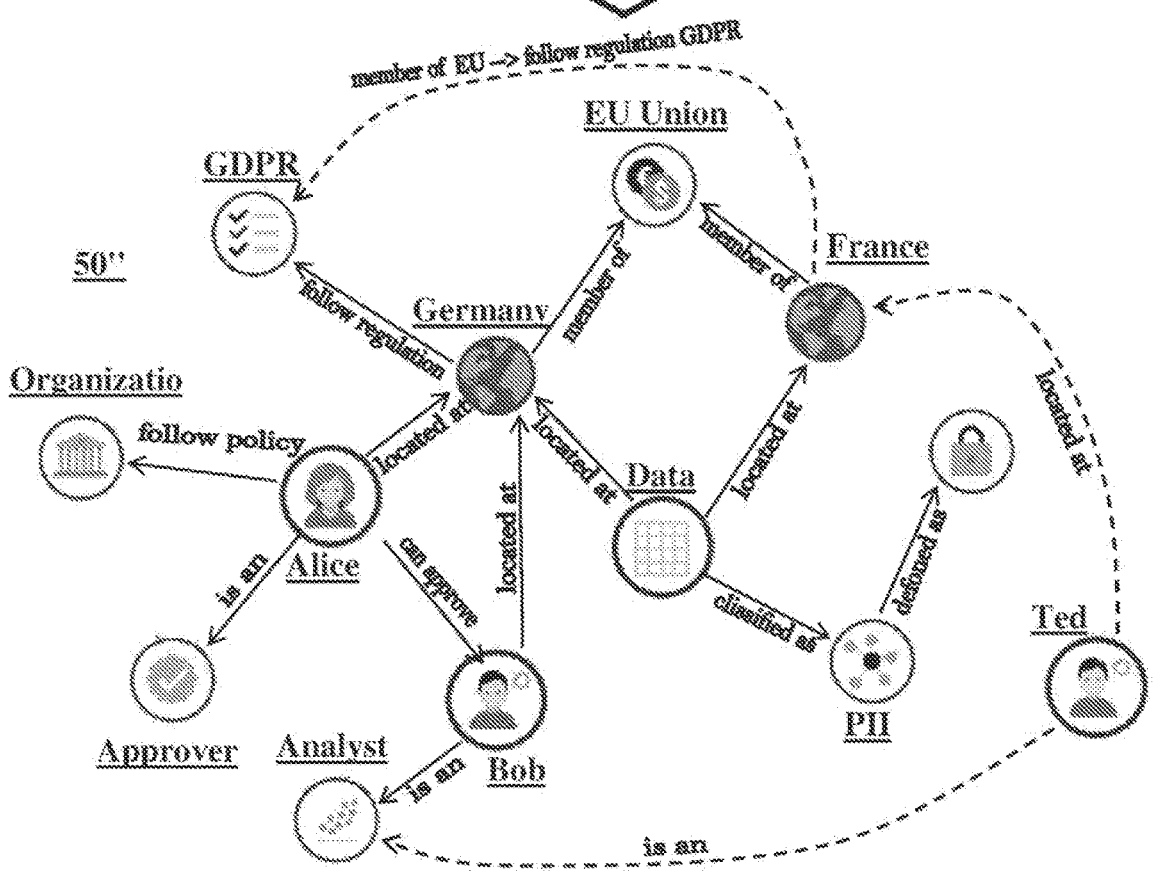

The compliance engine 11 can then augment/modify the knowledge graphs of the newly received data access request (72) based on the recommendations received from the ML services module 15 by incorporating in the knowledge graph(s) 50 of the newly received data access request (72) one or more actions and/or conditions defined in the knowledge graphs 50' of the similar previously approved data access requests, to thereby produce a modified data access request (50" in FIG. 5B). The compliance engine 11 can then transfer the modified data access request (50") for examination by the approver(s) 22.

If the modified data access request (50") is approved by the approver(s) 22, it is analysed by the cybernetic modelling system 13 for modelling the same and identifying in its knowledge graphs entities, conditions and/or actions, that are common in the the knowledge graphs (50') of the similar previously approved data access requests recorded in the policy catalogue 12 and associated with the knowledge graph(s) (50) of the newly received data access request (72). The cybernetic modelling system 13 can assign weights to the common entities and/or their associated conditions and/or actions, as identified in the knowledge graphs (50') of the similar previously approved data access requests, according to determined scores and/or approval rates computed for each common entity and/or its associated condition and/or action, according to its number of instances in the knowledge graphs (50') of the similar data access request relative to the total number of similar data access requests. The knowledge graphs of the approved data access request are then recorded in the policy catalogue 12 for use and reference in the processing of future data access requests by the ML model trainer 15*t*, the ML services module 15, and/or the cybernetic modelling system 13.

Figure 7:
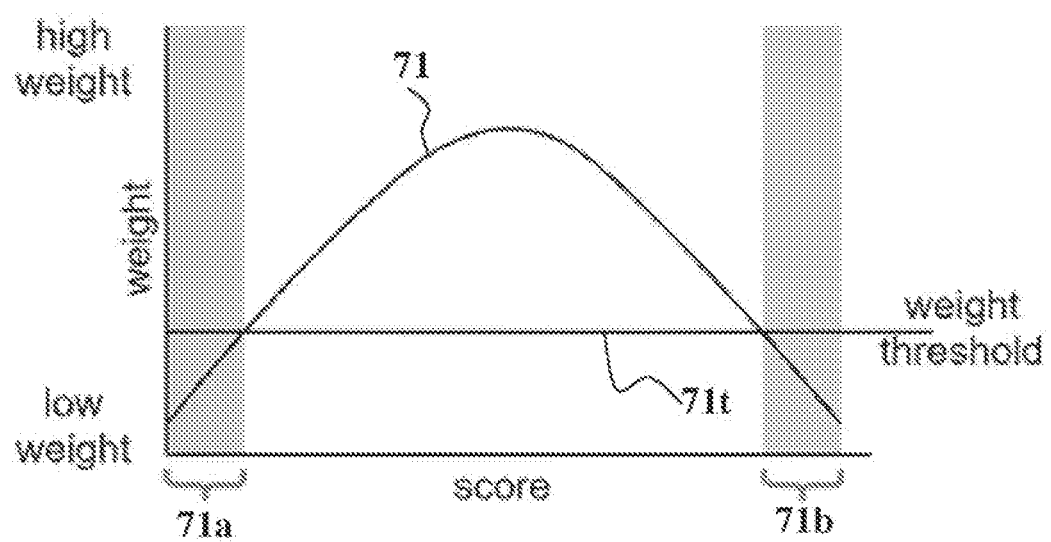
FIG. 7 exemplifies determination of weights for actions/conditions of knowledge graphs according to some possible embodiments.

FIG. 7 exemplifies conversion of scores assigned to entities, conditions and/or actions that are common to knowledge graphs of a global knowledge graph defined by the system 10. The scores can be simply determined as the number of instances of each entity (62), condition and/or action, in the global knowledge graph (55). Optionally, the architect(s) 23 can define some fields of a data access request as "important", and the system can be configured to add some score to the entity that represent the "important" fields. The conversion curve 71 used for determining the respective weights to be assigned to each entity, condition and/or action, according to its score can be defined by the architect (s) 23 to comply with a desirous score-to-weight distribution e.g., in order to improve data access request fulfilment the conversion curve 71 is adjusted such that the action that was used in the majority of the previously approved data access requests will be suggested by the system.

The high score of all the fulfilled requests represents the set of actions taken to fulfil those requests. For the "edges" i.e., low score 71*a*, those previous requests were fulfilled by different actions, possibly meaning a breach of policy or special cases where the request was fulfilled, but not according to recommendations. In possible embodiments the requests which scores' are clustered at the edges 71*a*,71*b* of the curve 71 i.e., smaller than the weight threshold 71*t*, are considered to represent anomalies. Legitimate anomalies may occur due to a missing policy, that applies to the specific condition that caused the low score. Optionally, but in some embodiments preferably, the system is configured such that after few similar requests that have been identified to cause the low score issue, the system will suggest to generate a new policy, or update an existing policy based on the findings, to avoid such anomalies in the future.

The edges of the distribution graph, 71*a* and 71*b*, represent actions of data access request that may not comply with corresponding/similar policies recorded in the policy catalogue 12. A weight threshold 71*t* can be accordingly defined for use by the compliance engine 11 to identify actions having weights that don't comply with recorded policies. For example, a policy recorded in the policy catalogue 12 can require approval of a data access request having similar characteristics, but the compliance officer (approver 22) decided to reject the similar data access request because the action manually defined therein does not comply with the policy of the organization. The system 10 is configured in some embodiments to identify that the current data access request is a special case that present a change in policy, or a new policy that should become effective based on the weights of the rest of the elements of the knowledge graph. In addition, when a request has been fulfilled not in accordance with effective policy of the policy catalogue 12, the system 10 can be configured to generate an alert to validate/verify that the action indeed does not comply with organizational policies.

If the modified data access request (50") is rejected by the approver(s) 22, the cybernetic modelling system 13 determines based on the rejection received from the approver(s) 22 one or more actions and/or conditions that are missing in the modified data access request, and that are required for its approval. The one or more missing actions and/or conditions can be explicitly indicated in the rejection received from the approver(s) 22, and/or independently determined by the cybernetic modelling system 13 based on further inspection of similar data access requests recorded in the policy catalogue 12 and/or weights of their elements.

The cybernetic modelling system 13 can then provide corresponding recommendations to the compliance engine 11 to further (or differently) modify the modified data access request (55), and/or for further processing by the ML model trainer 15*t* and/or the ML services module 15, for determining further similarities to previously approved data access requests 50' recorded in the policy catalogue 12, and/or conditions and/or actions of such similar data access request 50', for determination of corresponding recommendations to the compliance engine 11. The cybernetic modelling system 13 can further provide the compliance engine recommendations to define a new policy for the further (differently) modified data access request, and record the same in the policy catalogue 12 for further future use.

The cybernetic modelling system 13 can be accordingly configured to systematically retrieve more knowledge rules than explicitly defined by the knowledge graphs (50) of the data access request 72 being examined by the compliance engine 11. For example, in FIG. 5B the knowledge graph 50 produced by the request/policy builder module 16*b* for a specific data access request (72) can be augmented (50") by the compliance engine 11 based on recommendations received from the cybernetic modelling system 13 to incorporate additional node(s) ('Ted') and additional edges (shown in dashed-arrowed lines) introduced there into based on the modelling performed to previously approved data access requests (50') recorded in the policy catalogue 12. This way, the cybernetic modelling system 13 can recommend introduction of conditions and/or actions to the knowledge graphs 50 of the data access requests (72) examined by the compliance engine 11.

The data access management system 10 can be configured for integration with external 3$^{rd}$ party data solutions, such as, but not limited to google cloud platform (GCP). The GCP is a highly extensive platform providing API endpoints to almost any aspect of the managed data, which can be used to access a set of databases and storage solutions e.g., BigQuery, Bigtable, Cloud SQL, Cloud Spanner, Firestore and suchlike. The data access management system 10 may further support additional cloud service providers, as well as on-premise solutions (e.g., AWS, Azure, Snowflake, Cloudera, Collibra and more).

Figure 3:
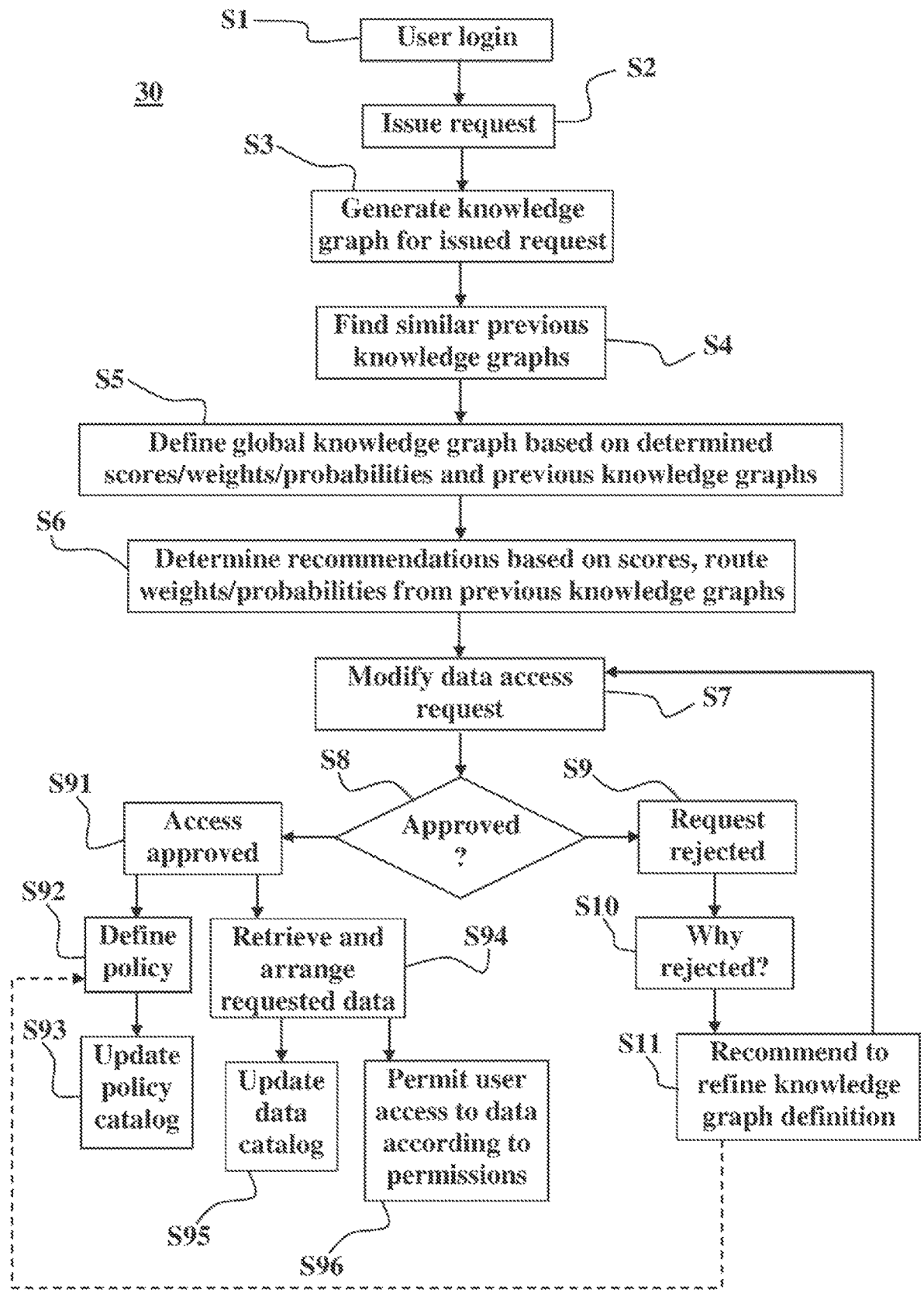
FIG. 3 is a flowchart schematically illustrating evolution and processing of a data access request according to some possible embodiments.

FIG. 3 is a flowchart 30 exemplifying constructions and processing of a data access request process according to some possible embodiments. The process 30 starts in the user login of step S1, wherein the consumer (21) accessing the request/policy builder module (16b) is authenticated. In step S2 the consumer (21) utilizes the user interfaces (e.g., 40) to issue a data access request (72), and in step S3 the request/policy builder module (16b) generates respective one or more knowledge graphs (e.g., 50) for the issued data access request (72).

In step S4 the ML model trainer system (15t) process the knowledge graph(s) (50) of the issued data access request (72) and identify in the policy catalogue (12) knowledge graphs (50') of one or more similar previously approved data access requests. Next, a global knowledge graph (55) is defined in step S5, by association of knowledge graph(s) (50) of the newly issued data access request (72) with the knowledge graphs (50') of the identified similar previously approved data access requests.

In step S6, the ML services module (15, and/or other processing means 15p) examines the global knowledge graph in relation to one or more knowledge graphs generated for the issued data access request, and determines the recommendations for the compliance engine (11) to incorporate actions and/or conditions in the knowledge graphs of the issued data access request (72), based on scores/weights assigned to actions and/or conditions defined in the global knowledge graph (55) for the similar previously approved data access requests recorded in the policy catalogue (12). A modified data access request can be issued in step S7, if it is decided by the compliance engine (11) to incorporate in the issued data access request (72) the actions/conditions recommended by the ML services module (15).

The ML module (15) and/or other processing means (15p) can produce a measure of approval probability for the issued data access request based on the determined scores and/or weights and/or condition of the global knowledge graph, and/or based on a determined level of similarity between the knowledge graphs of the global knowledge graph and the one or more knowledge graphs generated for the issued data access request. The measure of approval probability can be then used by the ML module (15) and/or other processing means (15p) in determining the recommendations, and/or the type, and/or amount, of actions and/or conditions for augmenting/modifying the data access request.

For example, if a high measure of approval probability is determined (e.g., due to high level of similarity between the issued data access request and the one or more similar previously approved data access requests), then the recommendations from the ML module (15) and/or other processing means (15p) may suggest making minor changes/additions to the issued data, or leaving it intact i.e., without making any changes/additions thereto. Similarly, if a low measure of approval probability is determined (e.g., due to low level of similarity between the data access requests), then the recommendations from the ML module (15) and/or other processing means (15p) may suggest a plurality of changes/additions to the issued data access request for increasing its approval probability.

The issued/modified data access request is examined in step S8 by the approver(s) (22). If the issued/modified data access request is rejected in step S9, then in step S10 the cybernetic modeling system (13) determines the reasons for rejection, and in step S11 it provides respective recommendations to the compliance engine (11) to further modify the issued data access request (72) for increasing its approval probability. Optionally (indicated by dashed-arrowed line), but in some embodiments preferably, a new policy is defined in step S92 based on the issued/modified data access request and the recommendations obtained therefore in step S11, and in step S93 the policy catalogue is updated by recording therein the newly defined policy.

Following step S11 the control is passed back to step S7, wherein the compliance engine (11) can further (differently) modify the knowledge graph(s) (50) of the rejected data access request for further examining it by the approver(s) in step S8. The loop of steps S7 to S11 can be repeated any number of times until the data access request is approved in step S91. After approval, the compliance engine (11) can accordingly define a new policy in step S92 for the approved data access request, and record the same in the policy catalogue in step S93. In addition, the compliance engine (11) can also retrieve and arrange/manipulate the requested data in step S94 in order for it to comply with conditions and required actions, as defined in the knowledge graph of the approved data access request, and in step S96 the access to the arranged/manipulated data is granted to the consumer (21) by the compliance engine (11). The compliance engine (11) can further update data catalogue (16d) accordingly in step S95 to reflect the granted data, metadata, and/or tags, as well as update identity providers (IAM, Active Directory, etc.) with the access approved for the specific consumer.

In some embodiments the data access management system 10 is configured to grant a specific user access to a specific view by means of access control lists (ACLs—a list of permissions associated with a system resource). The system can be further configured to controllably provide access to the requested data by executing extract-transform-load (ETL—copying data from one or more sources and representing the same in a different context) procedures.

Figure 8:
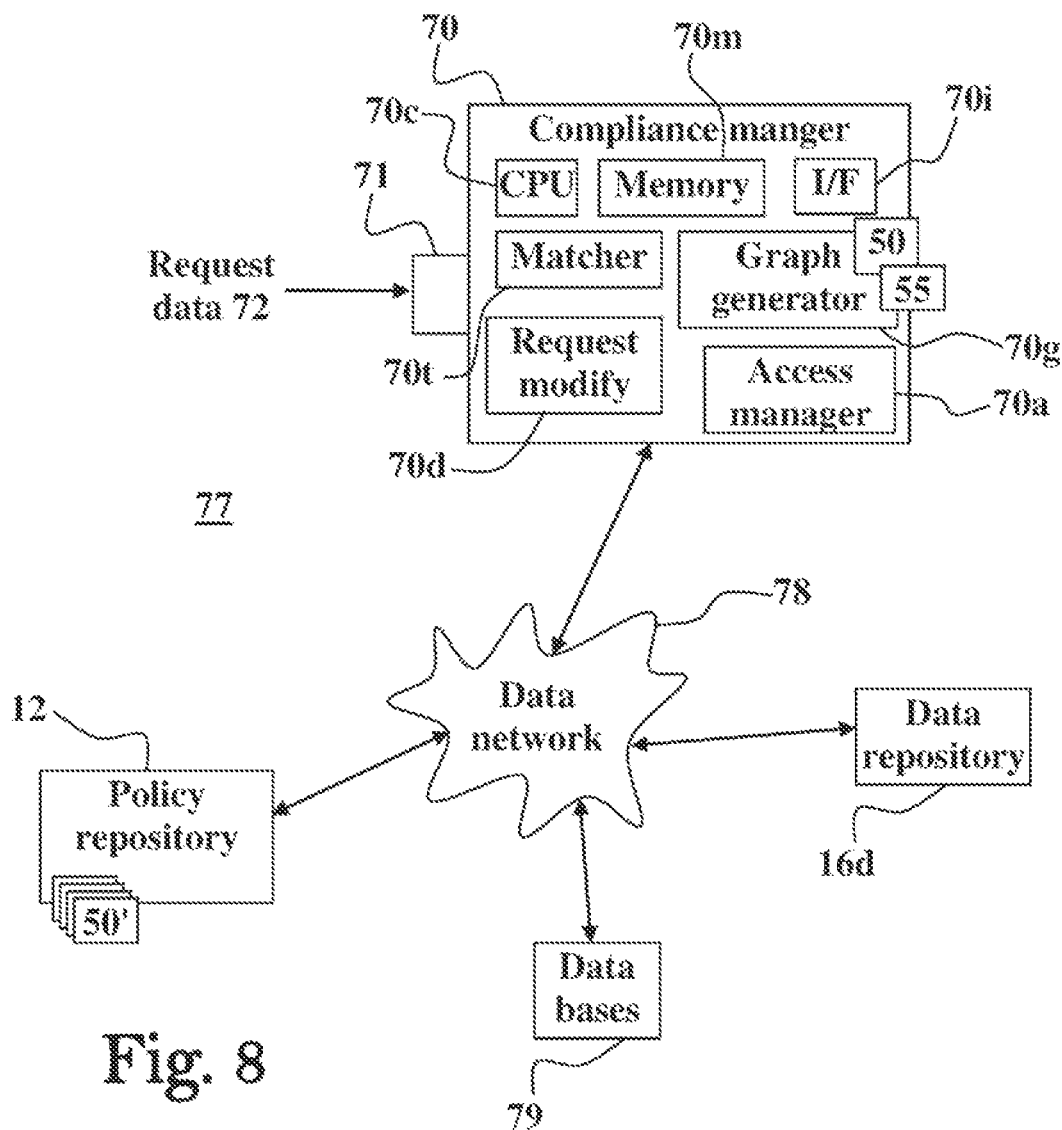
FIG. 8 schematically illustrates a computer system for data access management according to some possible embodiments.

FIG. 8 is a block diagram schematically illustrating an access permission management system 77 according to some possible embodiments. The system 77 comprises a compliance manager 70 implementation in a computer system 70 comprising one or more processors 70c and memories 70m configured and operable to execute computer instructions software code for managing data access requests 72 received via and input device 71 (e.g., keyboard, touchscreen, disk on key) of the system. The system 77 comprises in some embodiments a communication interface (I/F) module 70i configured to communicate data/signals over a data network 78. Accordingly, the data access request 72 can be received in the system 77 via the data network 78, instead of the input device 71, which in this case can be removed from the system.

The system 77 is configured to store the data access request 72 in its memory 70m, and process the received data access request 72 by its one or more processors 70c. The system 77 comprises a graph generator module 70g configured and operable to generate one or more knowledge graphs 50 based on the processed data access request 72. A graph matching module 70t can be used in the system 70 to access a policy repository 12 (e.g., over the data network 78) and identify therein one or more knowledge graphs 50' of previously approved data access requests having similarities with the one or more knowledge graphs 50 generated for the data access request 72 by the graph generator 70g. The graph generator module 70g can be then used to generate a global knowledge graph 55 comprising the one or more knowledge graphs 51' identified by the graph matching module 70g and store the same in the memory 70m with association to the data access request 72.

The one or more processors 70c can be then used to determining from the global knowledge graph 55 generated by the graph generator module 70g one or more recommendations for improving probability of approval of the data access request 72. Optionally, but in some embodiments preferably, a request modifier module 70d is then used to modify and/or augment at least one of the one or more knowledge graphs 50 generated by the graph generator module 70g for the data access request 72 based on the generated recommendations, and thereafter issues a modified and/or augmented data access request, accordingly.

The one or more processors 70c can be used to generate a policy from the one or more knowledge graphs of the modified and/or augmented data access request, whenever the modified and/or augmented data access request is approved, and store the same in the policy repository 12. The knowledge graphs of the modified and/or augmented data access request can be further augmented/modified by the request modifier module 70d according to weights and/or priorities of elements of knowledge graphs included in the global knowledge graph.

The one or more processors 70c can be further used in some embodiments to store metadata and/or tagging data items incorporated in the data access request 72 in a dedicated data repository 16d e.g., over the data network 78. In possible embodiments the system 77 comprises an access manger module 70a used for managing/monitoring the access to data stored in one or more databases 79 according to data access conditions defined in data access requests 72 that been approved. The access manger module 70a can be used to extract/transform the data accessed in the databases 79, represent the same within limitations define by the authorized data access request.

It is noted that throughout this disclosure, where a process or method is shown or described, the steps of the method may be performed in any order or simultaneously, unless it is clear from the context that one step depends on another being performed first. The operations/methods steps in accordance with the teachings herein may be performed by a computer specially constructed for the desired purposes or by a general-purpose computer specially configured for the desired purpose by a computer program stored in a non-transitory computer-readable storage medium. The terms "non-transitory memory" and "non-transitory storage medium" used herein should be expansively construed to cover any volatile or non-volatile computer memory suitable to the presently disclosed subject matter.

It is also noted that terms such as first, second, . . . etc. may be used to refer to specific elements disclosed herein without limiting, but rather to distinguish between the disclosed elements.

It is noted that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention. Unless specifically stated otherwise, as apparent from the following discussions, it is appreciated that throughout the specification discussions utilizing terms such as "processing", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, processing and memory circuitries, as disclosed in the present application.

As described hereinabove and shown in the associated figures, the present application provides data access management system and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above. all without exceeding the scope of the claims.

The invention claimed is:

1. A computer-implemented data access management system comprising:
   at least one hardware processor;
   at least one communication interface connected to a data communication network;
   at least one non-transitory computer-readable storage medium storing executable code, and a policy catalogue database, that when executed by said at least one hardware processor, causes the at least one hardware processor to:
   receive, via the communication interface, data characterizing a data access request requesting access to at least one database connected to the data communication network;
   generate, using a domain specific language (DSL), one or more knowledge graphs from the received data access request, wherein the knowledge graphs represent entities and data items of the data access request and relationships therebetween;
   identify one or more knowledge graphs of previously approved data access requests stored in the policy catalogue database having similarities with the one or more generated knowledge graphs;
   generate a global knowledge graph by combining the identified knowledge graphs with the generated knowledge graphs;
   determine, using cybernetic modeling, one or more recommendations for improving probability of approval of the data access request by analyzing patterns of actions and conditions in the global knowledge graph;
   modify and/or augment at least one of the one or more knowledge graphs based on the determined recommendations;
   issue a modified data access request;
   manage and monitor authorization of the modified data access request by executing data handling actions specified in the approved request; and
   control and monitor data access to the at least one database by executing data transformation operations according to authorized request limitations.

2. The computer-implemented data access management system according to claim 1, wherein said executable code further cause the at least one hardware processor, when executed by said at least one hardware processor, to receive and to process resolution data indicative of approval or denial of the modified and/or augmented data access request, and to generate based thereon recommendation data for further processing of said modified and/or augmented data access request.

3. The computer-implemented data access management system according to claim 2 wherein the recommendation data is configured to cause the at least one hardware processor, when executing said executable code, to generate a policy from the one or more knowledge graphs of the modified and/or augmented data access request whenever the resolution data is indicative of approval of said modified and/or augmented data access request.

4. The computer-implemented data access management system according to claim 1, wherein the recommendation data is configured to cause the at least hardware processor, when executing said executable code, to further augment and/or modify the knowledge graphs of the modified and/or augmented data access request according to weights and/or priorities of elements of knowledge graphs included in the global knowledge graph.

5. The computer-implemented data access management system according to claim 4 wherein the recommendation data is configured to further cause the at least hardware processor, when executing said executable code, to generate a policy from the one or more knowledge graphs of the further modified and/or augmented data access request.

6. The computer-implemented data access management system according to claim 1, comprising a data catalogue repository configured for storing metadata and/or tagging data items incorporated in the data access requests.

7. The computer-implemented data access management system according to claim 1, wherein said executable code further cause the at least one hardware processor, when executed by said at least one hardware processor, to extract and/or transform data from one or more data sources and represent the same within limitations defined by the authorized data access request.

8. The computer-implemented data access management system according to claim 1, comprising a policy repository for storing knowledge graphs of the modified and/or augmented data access requests that been authorized, and their generated recommendations.

9. A computer-implemented data access management method, comprising:
receiving data characterizing a data access request requesting access to at least one database connected to a data communication network;
generating, using a domain specific language (DSL), one or more knowledge graphs from the received data access request, wherein the knowledge graphs represent entities and data items of the data access request and relationships therebetween;
identifying one or more knowledge graphs of previously approved data access requests stored in a policy catalogue database having similarities with the one or more generated knowledge graphs;
generating a global knowledge graph by combining the identified knowledge graphs with the generated knowledge graphs;
determining, using cybernetic modeling, one or more recommendations for improving probability of approval of the data access request by analyzing patterns of actions and conditions in the global knowledge graph;
modifying and/or augmenting at least one of the one or more knowledge graphs based on the determined recommendations;
issuing a modified data access request;
managing and monitoring authorization of the modified data access request by executing data handling actions specified in the approved request; and
causing at least one hardware processor to control and monitor data access to the at least one database by executing data transformation operations according to authorized request limitations.

10. The method according to claim 9, comprising receiving and processing resolution data indicative of approval or denial of the modified and/or augmented data access request, and generating based thereon recommendation data for further processing of said modified and/or augmented data access request.

11. The method according to claim 10 comprising generating a policy from the one or more knowledge graphs of the modified and/or augmented data access request whenever the resolution data is indicative of approval of said modified and/or augmented data access request.

12. The method according to claim 9, comprising further augmenting and/or modifying the knowledge graphs of the modified and/or augmented data access request according to weights and/or priorities of elements of knowledge graphs included in the global knowledge graph.

13. The method according to claim 12 comprising generating a policy from the one or more knowledge graphs of the further modified and/or augmented data access request.

14. The method according to claim 9, comprising storing metadata and/or tagging data items incorporated in the data access requests in a dedicated repository.

15. The method according to claim 9, further comprising extracting and/or transforming data from one or more data sources and representing the same within limitations defined by the authorized data access request.

16. The method according to claim 9, comprising storing in a repository knowledge graphs of the modified and/or augmented data access request data access requests that been authorized, and their generated recommendations.

* * * * *